United States Patent
Ono

(10) Patent No.: US 8,223,209 B2
(45) Date of Patent: Jul. 17, 2012

(54) PARAMETER CONFIGURATION APPARATUS AND METHOD

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 11/552,190

(22) Filed: Oct. 24, 2006

(65) Prior Publication Data

US 2007/0097223 A1 May 3, 2007

(30) Foreign Application Priority Data

Oct. 25, 2005 (JP) .................................. 2005-310501

(51) Int. Cl.
*G09G 5/00* (2006.01)

(52) U.S. Cl. ............. 348/207.1; 348/207.11; 348/222.1; 348/223.1; 348/229.1; 345/156

(58) Field of Classification Search ............... 348/207.1, 348/207.11

See application file for complete search history.

(56) References Cited

U.S. PATENT DOCUMENTS

| | | | | |
|---|---|---|---|---|
| 6,977,672 B1* | 12/2005 | Okuno | ...................... | 348/207.11 |
| 6,982,747 B2* | 1/2006 | Yamagishi | .................. | 348/211.1 |
| 7,106,364 B1* | 9/2006 | Noro et al. | ................. | 348/211.3 |
| 7,161,619 B1* | 1/2007 | Niida et al. | .............. | 348/207.11 |
| 7,292,267 B2* | 11/2007 | Prentice et al. | ............ | 348/207.1 |
| 7,385,597 B2* | 6/2008 | Fukuda et al. | ................ | 345/184 |
| 7,511,735 B2 | 3/2009 | Uchida | | |
| 2002/0024611 A1* | 2/2002 | Watanabe et al. | ............. | 348/373 |
| 2002/0033886 A1* | 3/2002 | Hatanaka | ...................... | 348/211 |
| 2002/0105580 A1* | 8/2002 | Chandler | ................. | 348/207.11 |
| 2003/0090690 A1* | 5/2003 | Katayama et al. | ............. | 358/1.9 |
| 2004/0141069 A1* | 7/2004 | Nakami | ..................... | 348/231.6 |
| 2005/0134939 A1 | 6/2005 | Ikeda et al. | | |
| 2005/0174589 A1* | 8/2005 | Tokiwa | .......................... | 358/1.9 |
| 2005/0213793 A1* | 9/2005 | Oya et al. | ...................... | 382/103 |
| 2006/0044394 A1* | 3/2006 | Read | .......................... | 348/207.1 |

FOREIGN PATENT DOCUMENTS

| | | | |
|---|---|---|---|
| EP | 971529 A2 * | 1/2000 | |
| JP | 2000-232608 A | 8/2000 | |
| JP | 2005-109621 A | 4/2005 | |
| JP | 2005-176216 | 6/2005 | |

OTHER PUBLICATIONS

IEEE Standard for a High Performance Serial Bus, IEEE Std 1394-1995, pp. 1-384, 1995.

* cited by examiner

*Primary Examiner* — Chieh M Fan
*Assistant Examiner* — Dwight C Tejano
(74) *Attorney, Agent, or Firm* — Fitzpatrick, Cella, Harper & Scinto

(57) ABSTRACT

An image corresponding to an image processing parameter value currently configured in an image input device is displayed in an area. Images obtained when the image parameter value is changed to different values are displayed in areas around the area. A user can configure the parameter value in the image input device by selecting a desired image.

27 Claims, 10 Drawing Sheets

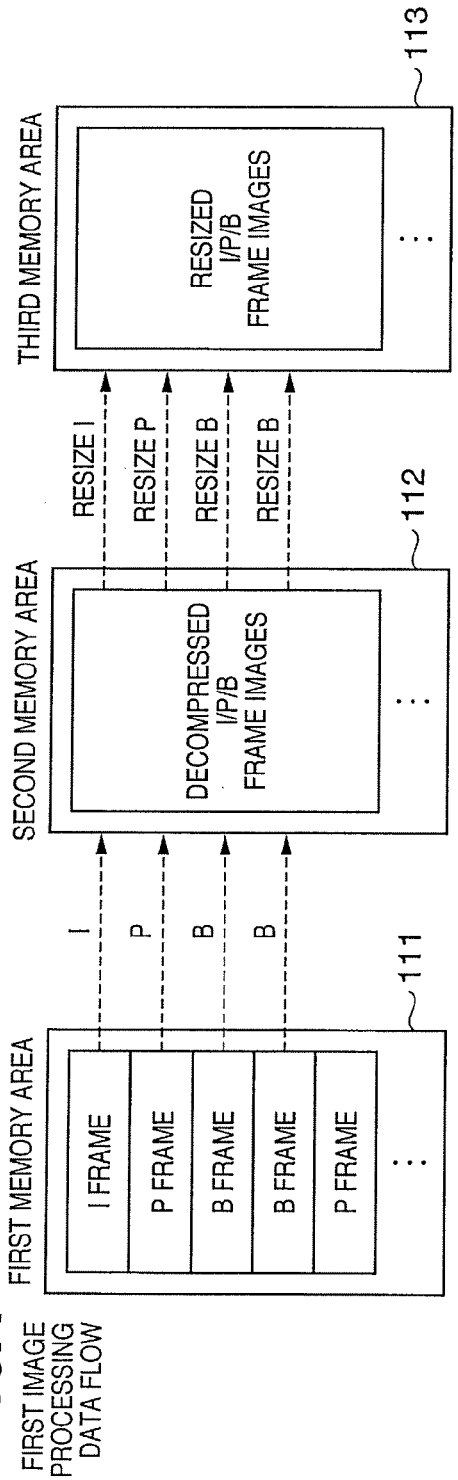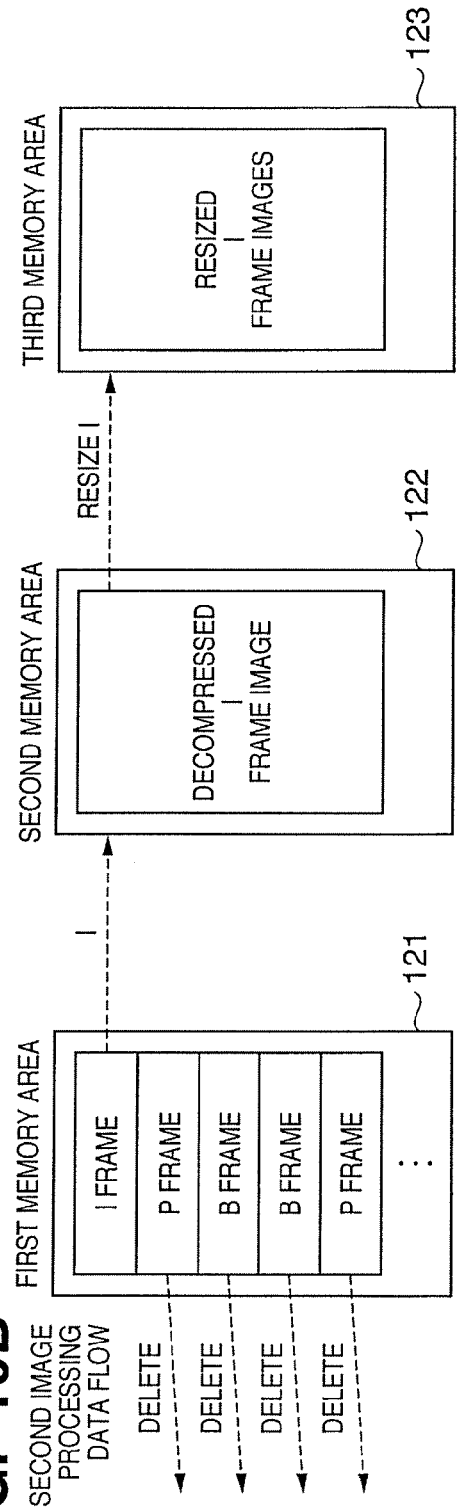

PARAMETER CONFIGURATION APPARATUS AND METHOD

BACKGROUND OF THE INVENTION

1. Field of the Invention

The present invention relates to a system, apparatus, method and computer program for externally configuring an image processing parameter for use in an image input device.

2. Description of the Related Art

Conventionally, among image processing applications, such as photo retouching software operating on a PC (personal computer), an application which displays both an original image and its processed image obtained by applying desired image processing for comparison is known.

Using such image processing application for color adjustment of an original image enables a user to tune a color adjustment parameter to obtain a desired result, while comparing the original image and a processed image to which a designated color adjustment has been applied.

Further, in digital cameras, setting of a layout of obtained still images for displaying the images arranged like a photo album has been proposed (Japanese Patent Application Laid-Open No. 2005-176216).

In this manner, image processing on image data obtained by image capturing using photo retouching software or the like on a PC and setting a display layout in a digital camera and outputting the laid out images have conventionally been proposed. However, these processings are independently performed on the PC and the camera and the processings do not cooperate with each other.

At this point, when a device to handle a moving picture such as a video camera is used, as the moving picture changes in real time differently from a still image, timing control is difficult in a single device, or there is an excessive processing load. Further, even when a similar image processing operation is applied to an input image, the obtained result may differ when the processing is applied. For example, there often occurs a difference between the result of image adjustment, such as image quality adjustment or color adjustment, by tuning a parameter of a video camera upon image capturing and the result of a similar image adjustment by PC software after image capturing.

Further, even image input devices of the same model may have slightly different characteristics. From these points, it can be considered that image quality adjustment or the like by a collaborative operation among devices easily produces a better result.

The image quality adjustment by a collaborative operation between a PC and a video camera may be performed as follows. First, software on the PC transmits an image processing request signal with a desired configured parameter to the video camera. The video camera performs image processing corresponding to the image processing request on an image obtained by image capturing, and transmits a video image resulted from the image processing to the PC. The software on the PC obtains the video image resulted from the image processing and displays the image on a screen. This operation is repeated a plurality of times while the image processing parameter is changed, and then the software on the PC simultaneously displays the images obtained from the video cameras for comparison. Then, a user selects an image having preferred color tone from the displayed images. Then, the software on the PC sends an image processing request with an image processing parameter configured in correspondence with the selected image to the video camera. Thereafter, image obtained by image capturing have the user's desired color tone.

The image processing by the collaborative operation between a software on the PC and the video camera can be performed in this manner. However, it is necessary to repeat the image processing request and the image capturing and output processing a plurality of times between these devices. The time required from the image processing request issued from the software on the PC to the acquisition of processed image differs according to the performance of the PC or video camera model. From the viewpoint of software processing, it is simple to perform the image processing request and the image display at constant intervals. However, to smoothly perform the collaborative operation in various combinations of PCs and video cameras, it is necessary to set sufficient time intervals, which increases processing time. Further, generally, a decoding processing operation required for displaying compressed video data transmitted from the video camera is a heavy burden imposed on the PC.

Particularly, assuming that the digital video camera and the PC are set in an actual image capturing site and used in a collaborative operation, it is desirable that the PC is a portable type machine. In this case, as the PC is battery-driven, it is desirable to reduce the processing load on the PC to achieve a reduction in electric power consumption.

SUMMARY OF THE INVENTION

The present invention is directed to overcome the above-described drawbacks and disadvantages. For example, the present invention enables to the connection of an image input device, such as a video camera, with an external device to easily configure an image processing parameter in the image input device from the external device.

According to an aspect of the present invention, there is provided a parameter configuration apparatus for externally configuring a value of an image processing parameter used in an image input device which outputs image data resulted from image processing according to the image processing parameter. The apparatus comprise: a change request unit which transmits a change request to change the value of the image processing parameter to a designated value to the image input device; a reception unit which receives the image data from the image input device; a display unit which displays the received image data; and a control unit which controls the change request unit to sequentially transmit a plurality of change requests to change the value of the image processing parameter to values respectively different from the designated value, control the reception unit to sequentially receive a plurality of image data reflecting the plurality of change requests, control a display unit to display the plurality of image data, and control the change request unit to transmit the change request to change the value of the image processing parameter to a value corresponding to one of the plurality of image data selected by a user, as the designated value.

According to another aspect of the present invention, there is provided a parameter configuration method for externally configuring a value of an image processing parameter used in an image input device which outputs image data resulted from image processing according to the image processing parameter. The method comprises the steps of: transmitting a change request to change the value of the image processing parameter to a designated value to the image input device; receiving the image data from the image input device; displaying the received image data; and controlling the transmitting step to sequentially transmit a plurality of change requests to change the value of the image processing parameter to values respectively different from the designated value, controlling the reception step to sequentially receive a plurality of image data reflecting the plurality of change requests, controlling the display step to display the plurality of image data, and controlling the transmitting step to transmit the change request to change the value of the image processing parameter to a value corresponding to one of the plurality of image data selected by a user, as the designated value.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

FIGS. 10A and 10B are explanatory diagrams showing the difference of image processing between the preview mode and the variation mode.

DESCRIPTION OF THE EMBODIMENTS

Exemplary embodiments, features and aspects of the present invention will now be described in detail below with reference to the attached drawings.

Figure 1:
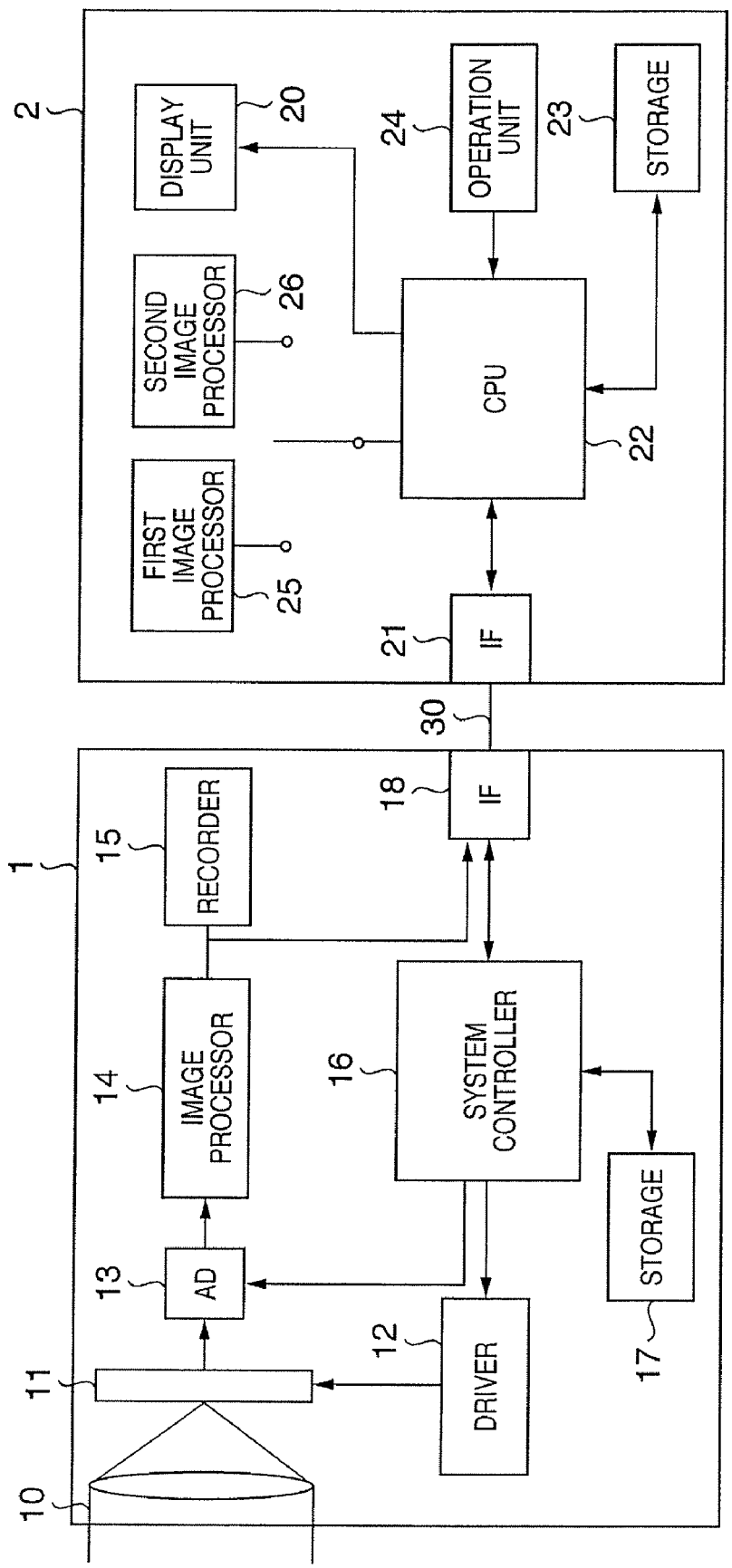
FIG. 1 is a block diagram showing a DVC 1 as an image input device and a personal computer 2 as a parameter configuration apparatus, constructing an image processing system according to an exemplary embodiment of the present invention.

FIG. 1 is a block diagram showing an image processing system according to an exemplary embodiment of the present invention constructed with an image input device and a parameter configuration apparatus. In the present embodiment, a DVC (digital video camera) 1 is used as an example of the image input device, and a PC (personal computer) 2 is used as an example of the parameter configuration apparatus.

Note that the image input device of the present embodiment is not limited to the digital video camera but is applicable to any other device capable of performing the operations described as those of the DVC 1. For example, a digital camera, a cellular phone and a PDA having a moving picture capturing function may be employed. Further, the parameter configuration apparatus of the present embodiment is not limited to the personal computer but is applicable to any other device capable of performing the operations described as those of the PC 2.

In FIG. 1, the DVC 1 has the following construction. Further, image processing parameters configurable in the DVC 1 as an image input device include gamma, knee, black level, master pedestal level, setup level and sharpness, in addition to color gain. Further, the image processing parameters include a horizontal detail frequency, a horizontal/vertical detail balance, noise reduction, and coring. Further, the image processing parameters include a color matrix, a color gain, color hue, an R (red) gain, a G (green) gain, a B (blue) gain, and white balance. Further, the image processing parameters include matrices respectively to change a balance between two colors, an R-G matrix, an R-B matrix, a G-R matrix, a G-B matrix, a B-R matrix and a B-G matrix. These image processing parameters respectively have values, and are configurable from the PC 2 using a variation mode to be described later. That is, the respective image processing parameters can be configured from a current value to a desired value while variations are checked, by a similar procedure to that of color gain configuration. Further, it is also possible to configure a current value to a desired value using a setting menu or the like of the DVC 1.

In the DVC 1, a lens 10 brings a subject image into focus on an image sensing device 11. The image sensing device 11 converts the subject image focused through the lens 10 into an electric signal. A driver 12 drives the image sensing device 11. As the image sensing device 11, an image sensor such as a CCD sensor or a CMOS sensor may be used. Further, an A/D converter 13 converts an analog image signal outputted from the image sensing device 11 into a digital image signal. An image processor 14 performs image processing, such as color tone adjustment, on the digital image signal outputted from the A/D converter 13. A recorder 15 records the digital image signal processed by the image processor 14 onto a storage medium, such as a tape medium, a disk medium, a semiconductor memory or a hard disk. A system controller 16 controls the entire digital video camera. A storage 17 holds an operation program of the system controller 16, an in-process image signal, various image processing parameters and the like. The storage 17 is also used as a work area for the system controller 16. Further, a network interface (IF) 18 is an interface for the DVC 1 to perform communication with the PC 2. In the present embodiment, the network interface 18 is compliant with the IEEE 1394 standards (IEEE Std 1394-1995). Note that the network interface 18 is not limited to that compliant with the IEEE 1934 standards, but a network interface compliant with the USB standards (USB 2.0) may be used.

Further, in FIG. 1, the PC 2 is a general personal computer having a general construction, but has, as minimum constituent elements, the following units. A storage unit 23, which is a hard disk drive or the like, holds application software or the like operating on the PC. A CPU 22 executes software stored in the storage unit 23, and realizes various functions including processing to be described later. A display unit 20, which is a liquid crystal display or the like, displays necessary information in accordance with processing by the CPU. An operation unit 24 having a keyboard, a mouse and the like is used upon a user's input of necessary information. A network interface (IF) 21 is an interface for the PC 2 to perform communication with the DVC 1. The display unit 20 and the operation unit 24 may be removable from the PC 2. Further, the PC 2, which is desirably a portable machine, may be a desk-top type machine. As the network interface 21, a similar interface to the network interface 18 may be used.

Further, a first image processor 25 and a second image processor 26 perform image processing to convert image data inputted from the network interface 21 into data in a format displayable on the display unit 20 by respectively different methods. Note that in FIG. 1, the first image processor 25 and the second image processor 26 are described as different blocks; however, they are realized as software by the CPU 22. Further, they may be realized using specialized hardware. Further, the network interfaces 18 and 21 are interconnected via a cable 30.

In the image processing system of the present embodiment, software on the PC 2 controls the DVC 1 utilizing AV/C commands or the like.

Data transfer using an IEEE 1394 interface is made by an isochronous transaction and an asynchronous transaction. The isochronous transaction is used upon real-time the transfer of moving picture, while the asynchronous transaction is used upon the transfer of control signal or the like. The DVC 1 of the present embodiment always outputs a video image being obtained by image capturing using the isochronous transaction from the network interface 18.

In the present embodiment, the video data outputted from the digital video camera is stream data, (MPEG-TS) compression-coded in the MPEG 2 format. Accordingly, to display the video data on the display unit 20 in the PC 2 as the receiving side, it is necessary to perform decompression processing.

Further, the PC 2 can adjust a color gain (color depth) which is one of the image processing parameters of the DVC 1 by transmitting a command or control signal in the asynchronous transaction.

Next, the operation of the image processing system having the above configuration will be described.

In the present embodiment, the PC 2 which functions as a parameter configuration apparatus has two display modes.

Figure 2:
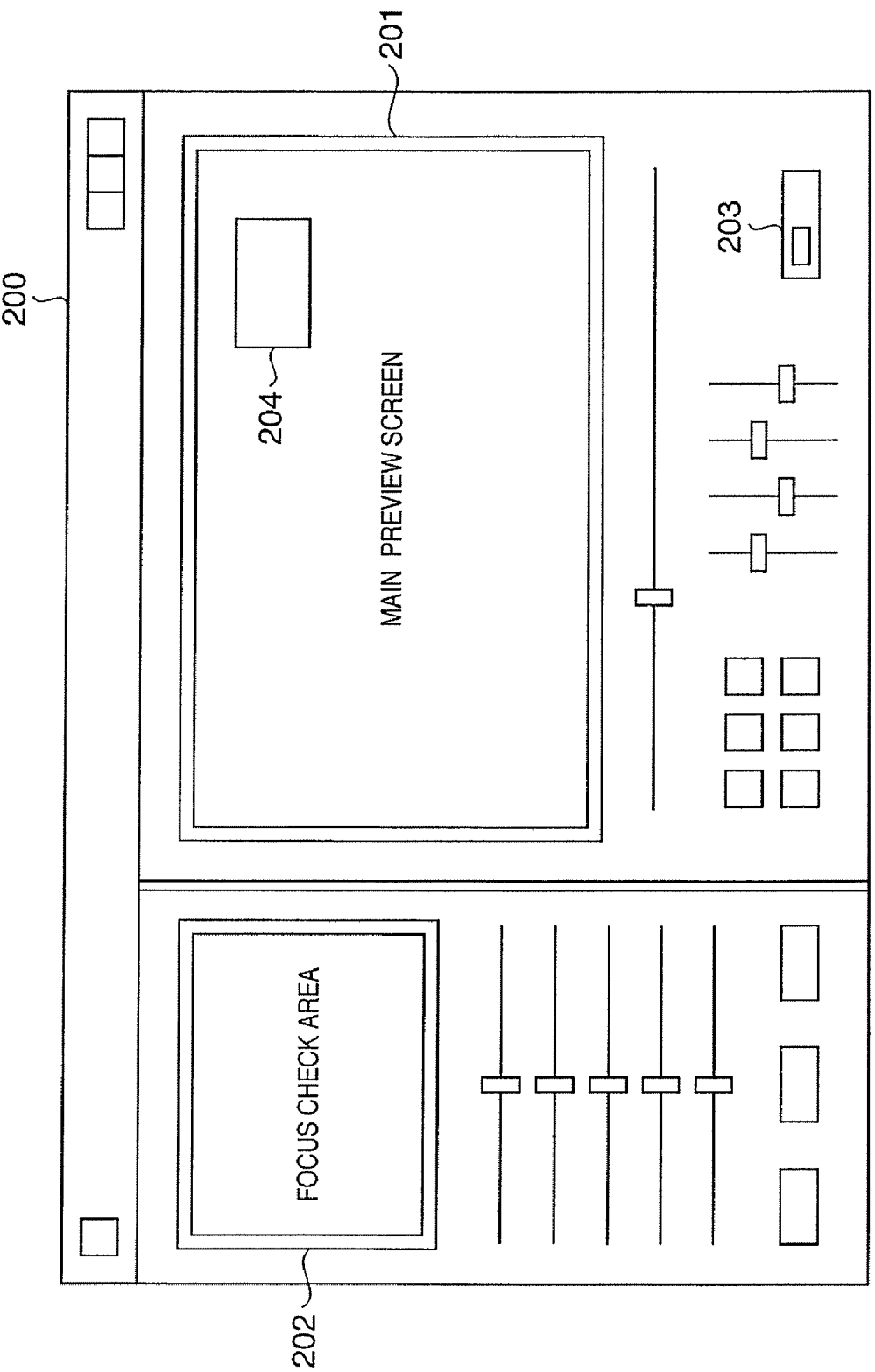
FIG. 2 illustrates an example of a GUI screen image displayed in a preview mode.

The first display mode is a preview mode to display image data transmitted from the DVC 1 without any change. FIG. 2 shows an example of a GUI (preview screen) 200 displayed on the display 20 in the preview mode by the control program (a parameter configuration program) which causes the PC 2 to function as a parameter configuration apparatus. In a main preview area 201, an image transmitted from the DVC 1 is displayed without any change. A focus check area 202 is used for checking the focus state of the image. For example, a part of the main preview area (e.g., a central portion) is enlarged and displayed in the focus check area 202. A mode switching button 203 is used for switching the display mode of the screen to the variation mode to be described later. Note that explanations of other buttons included in the preview screen 200 are omitted.

Note that the area displayed in the focus check area 202 may be movable. In this case, for example, a frame 204 to display an enlarged display area is superposed and displayed on the main preview area 201, and the frame 204 is moved by an operation of the operation unit 24. Then an enlarged image in an area corresponding to the position of the frame is displayed in the focus check area 202. Note that as described later, it is desirable that, not resized image data for display in the main preview area 201, but image data before resizing (i.e., before reduction) is used for a display in the focus check area 202. When the enlarged display area is fixed, the frame 204 may be omitted.

Figure 3:
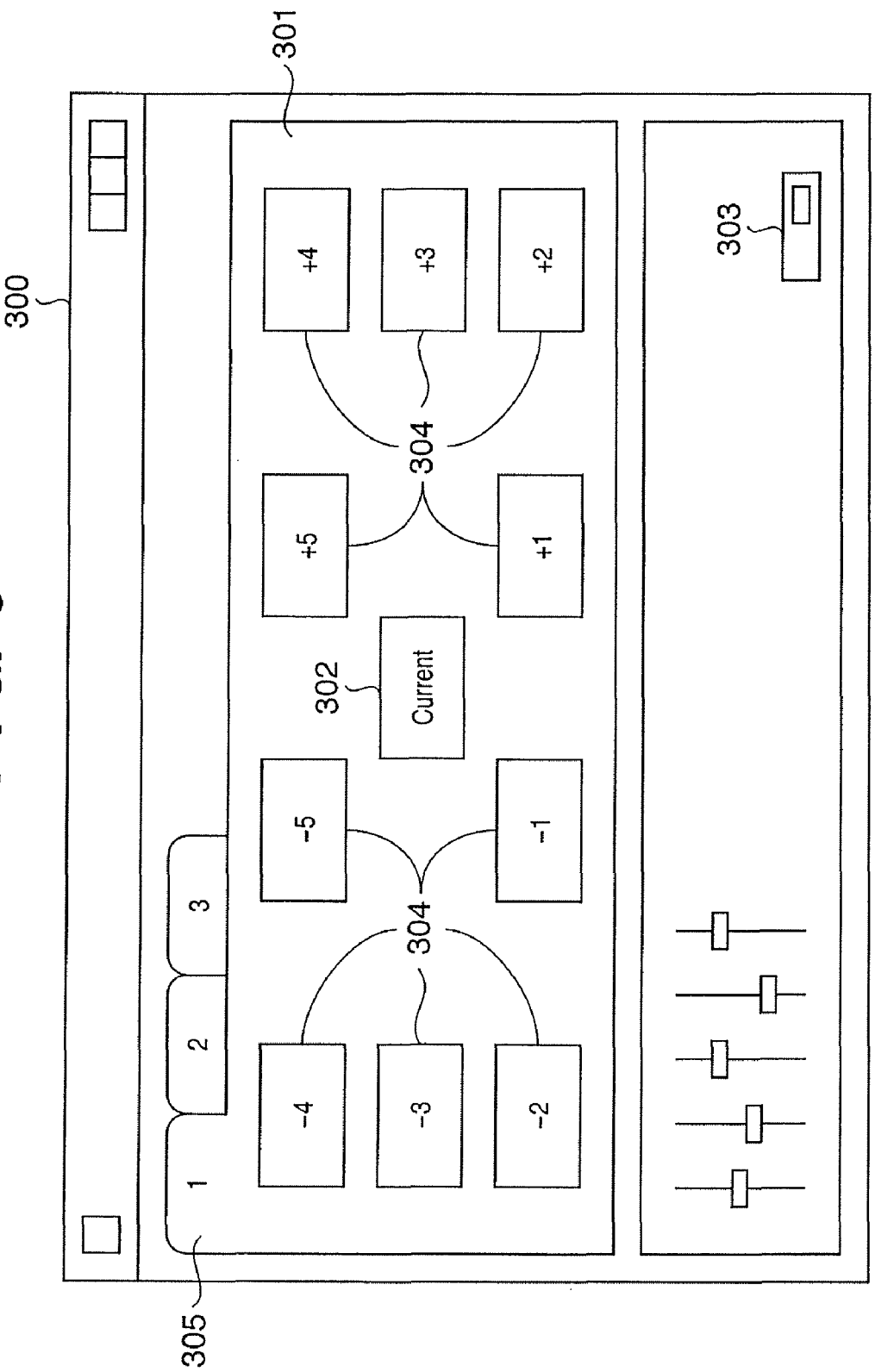
FIG. 3 illustrates an example of a GUI screen image displayed in a variation mode.

The second display mode is the variation mode to simultaneously display images resulted from image processing with respectively-changed different image processing parameters. FIG. 3 shows an example of a GUI (variation display screen) 300 displayed on the display unit 20 in the variation mode by the control application of the present embodiment.

In a variation screen 301, images showing the results of changes of an image processing parameter are displayed. In FIG. 3, an image reflecting an image processing parameter currently configured in the DVC 1 is displayed in a central area 302 of the variation screen 301, and images resulting from changes of the image processing parameter are displayed in peripheral areas 304. In the present embodiment, as described above, images resulting from changes of a color gain value are displayed in the areas 304. A tab 305 is used for screen switching upon a change of another parameter. The screen switch instruction by the operation of the tab 305 also acts as a parameter switch instruction. A mode switching button 303 is used for switching the display mode of the screen to the preview mode. Note that explanations of other buttons included in the variation display screen 300 are omitted.

(Processing in Preview Mode)

Figure 4:
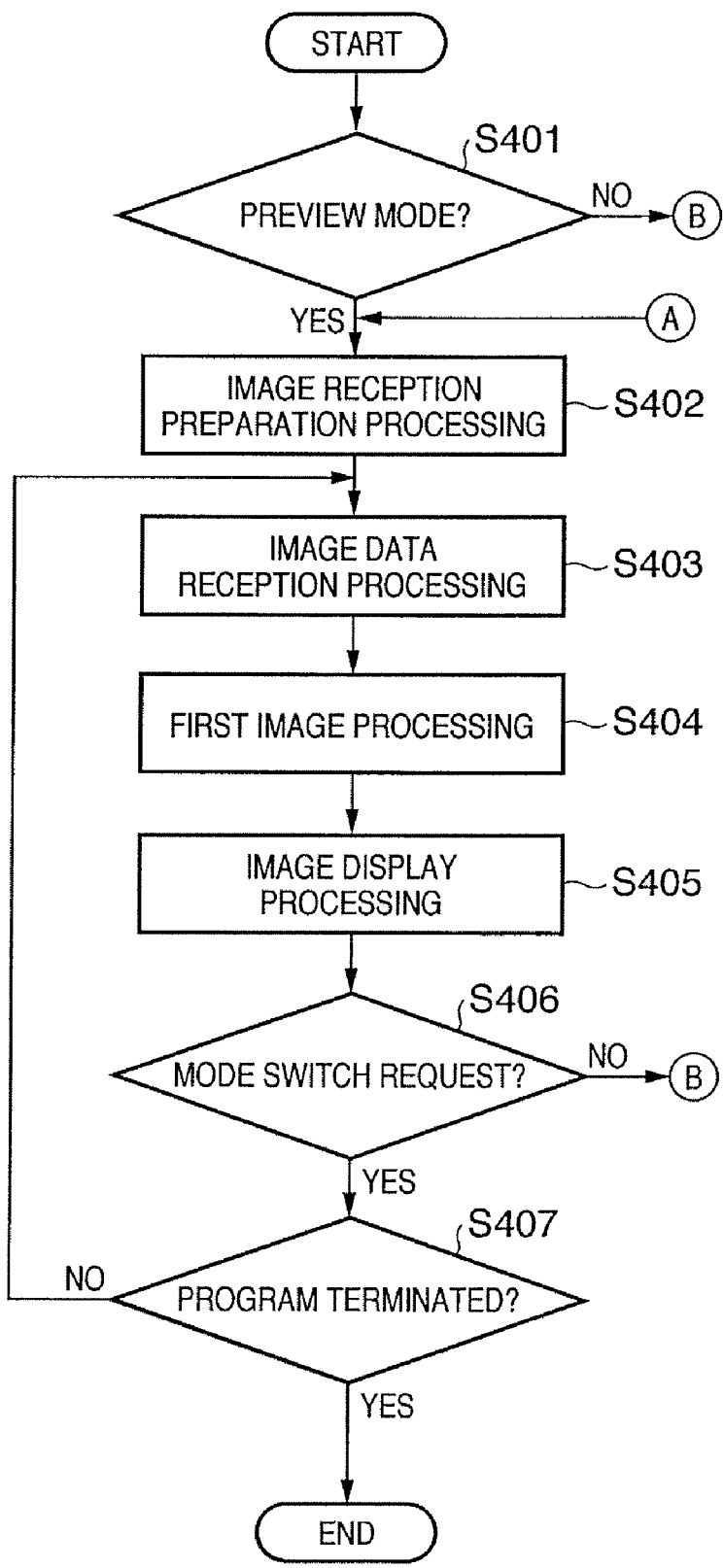
FIG. 4 is a flowchart showing an operation of the PC 2 in the preview mode according to the exemplary embodiment.

Next, the operation of the PC 2 in the preview mode will be described using the flowchart of FIG. 4 and FIG. 9.

Figure 9:
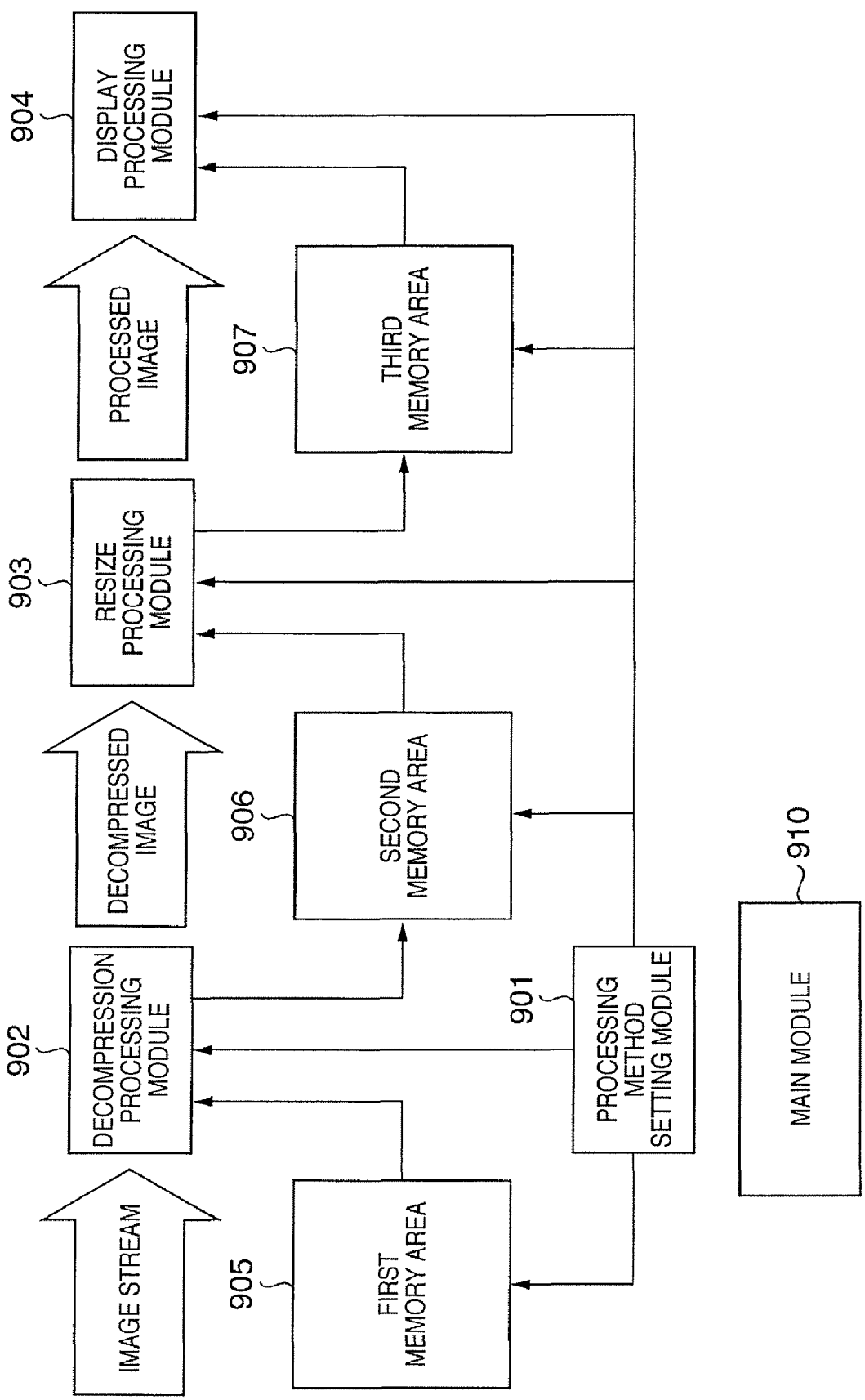
FIG. 9 is a block diagram showing the flow of display processing realized by a collaborative operation between function modules included in a control program to cause the PC 2 to function as the parameter configuration apparatus and hardware resources of the PC 2.

FIG. 9 is a block diagram showing the flow of display processing realized by a collaborative operation between function modules included in a control program to cause the PC 2 to function as the parameter configuration apparatus, and hardware resources of the PC 2. Note that in this specification, the control program to cause the PC 2 to function as the parameter configuration apparatus will also be referred to as a parameter configuration program.

In FIG. 9, reference numeral 901 denotes a processing method setting module to perform setting of first to third memory areas (905 to 907) used by image processing modules (902 to 904) and operation settings of the respective modules.

The first to third memory areas (905 to 907) are set in the storage unit 23 of the PC 2. The image processing modules (902 to 904) are modules to perform processing from reception of image data from the DVC 1 to display on the display 20. The image processing modules 902 to 904 correspond to the first and second image processors 25 and 26 in FIG. 1.

The decompression processing module 902 performs decompression on compression-coded image data outputted from the DVC 1. The resize processing module 903 performs resize processing on decompressed image data to a display size, i.e., a display size in the main preview area shown in FIG. 2. The display module 904 sequentially displays resized images.

The main module 910 detects an operation using the operation unit 24, performs communication with the DVC 1, and performs control operations other than display processing. The processing method setting module 901, the image processing modules 902 to 904, and the main module 910 are control programs executed by the CPU 22. The functions of the respective modules are realized by controlling the respective blocks shown in FIG. 1 by the CPU 22.

Figure 5:
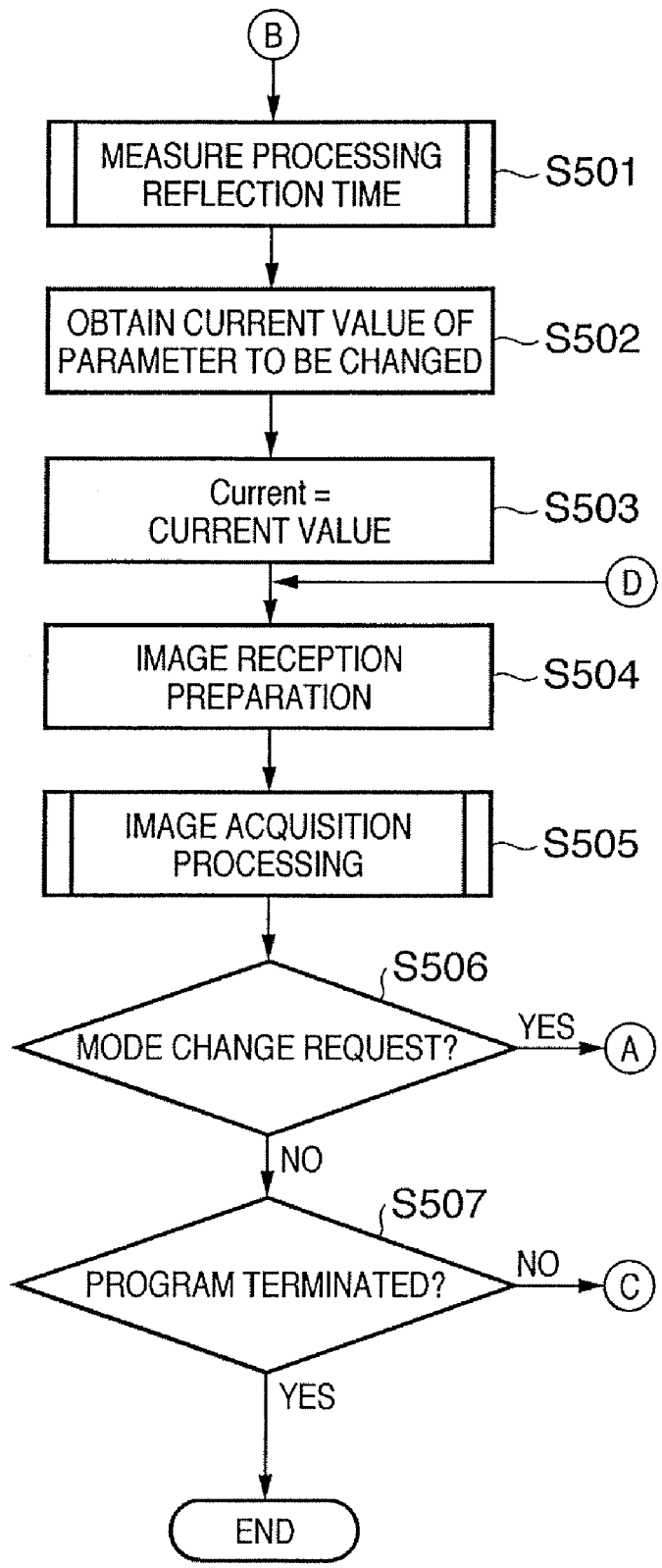
FIG. 5 is a flowchart showing an operation of the PC 2 in the variation mode according to the exemplary embodiment.

In step S401, the main module 910 checks the presence/absence of a display switch request between the preview mode/variation mode. That is, it is determined whether or not the mode switching button 203/303 on the respective display screen has been operated using the operation unit 24 on the display screen. If it is determined that the switching of the display mode to the variation mode has been instructed, the process moves to a processing procedure in the variation mode (FIG. 5).

In step S402, image reception preparation processing is performed.

In the image reception preparation processing performed in step S402, the processing method setting module 901 performs initial setting of the respective modules 902 to 904 and ensures the setting of memory areas necessary for image processing.

In step S403, image data reception is performed. An image stream transmitted from the DVC 1 is stored into the first memory area 905 as a part of the storage unit 23 through the network interface 18.

As described above, in the present embodiment, the image data outputted from the DVC 1 is compression coded in the MPEG 2 format. As the detailed specification of the MPEG 2 format are well known, a detailed the explanation of the specification will be omitted. Generally, in the MPEG 2 format, compression is performed by a GOP (Group Of Picture) process, where GOP refers to a plurality of picture frames. The plurality of picture frames constructing the GOP includes an I frame which is intra-frame compressed frame, a P frame compressed using the difference between a current picture and a previous picture in time sequence, and a B frame compressed using the difference between a current picture and a previous picture and the difference between the current picture and a subsequent picture in time sequence. In the present embodiment, one GOP has fifteen image frames including one I frame, four P frames and ten B frames.

Accordingly, in step S403, I frames, P frames and B frames are stored in accordance with the GOP structure into the first memory area 905 as shown in FIG. 10A (corresponding to a first memory area 111).

In step S404, processing as the first image processor 25 (first image processing) is performed. In this case, the decompression processing module 902 reads image data stored in the first memory area 905 by the GOP Process, and performs decompression processing on all the frames. Then, the decompressed image data is stored into the second memory area 906 (corresponding to a second memory area 112 in FIG. 10A).

The decompressed image data stored in the second memory area 906 is resized to a display size by the resize processing module 903, and stored into a third memory area 907.

In step S405, the resized image data stored in the third memory area 907 is displayed by the display module 904 in the main preview area 201 of the preview screen 200. In this arrangement, an image, currently obtained by image capturing by the digital video camera, is displayed in real time in the main preview area 201 as in the case of a so-called electronic view finder. Further, the display module 904 displays e.g. a predetermined area of the image data before resizing stored in the second memory area 906 in the focus check area 202. As the number of pixels of the image data before resizing is greater than that of the resized image data, the image data before resizing can be displayed as e.g. an image enlarged from a part of the main preview area.

In step S406, the main module 910 checks for the presence/absence of a mode switch request using the mode switching button 203, and if it is determined that a mode change request exists, the process moves to a processing procedure in the variation mode (FIG. 5).

In step S407, the main module 910 checks whether or not the image processing parameter configuration program is to be terminated. This checking operation is realized by detecting the presence/absence of a so-called application termination instruction. If it is determined that a termination instruction exists, all the modules are terminated, while if no termination instruction exists, the image reception and display processing is continued.

In this manner, in the preview mode, as shown in FIG. 10A, the duplication between the memory areas, the image decompression processing and the resize processing are performed on all the image frames. Accordingly, the processing load on the PC 2 is heavy.

(Processing in Variation Mode)

Next, the operation of the PC 2 in the variation mode will be described using the flowchart of FIG. 5.

First, in step S501, the processing reflection time is measured. The main module 910 of the parameter configuration program issues an image processing request to the DVC 1 using the asynchronous transaction, and measures the processing reflection time from the issuance of the request to detection of a processed image in correspondence with the image processing request. The details of the processing will be described later.

In step S502, the main module 910 obtains a current value of a parameter to be changed (the color gain in the present embodiment) among the image processing parameters of the DVC 1. In the present embodiment, the color gain as the parameter to be changed has 0 to 10 integral values, and color becomes deeper in accordance with increment of the integral value. The acquisition of color gain value is performed using the asynchronous transaction.

The main module 910 transmits an asynchronous packet to obtain a parameter value to the DVC 1, and the DVC 1 receives the packet and then transmits an asynchronous packet where a current color gain value is set to the PC 2.

In step S503, the main module 910 reads the color gain value from the asynchronous packet received from the DVC 1, and sets the value in "Current" as an internal variable. The variable "Current" holds the current color gain value.

In step S504, preparation for acquisition and display of an image outputted from the DVC 1 is made. More particularly, as in the case of step S402, the processing method setting module 901 performs initial setting of the respective image processing modules 902 to 904 and ensures the setting of the first to third memory areas.

In step S505, the respective image processing modules 902 to 904 perform image acquisition processing. The details of the processing will be described later.

In step S506, the main module 910 checks for the presence/absence of a mode change request. If the mode change request exists, the current mode is changed to the preview mode and preview mode processing in FIG. 4 is performed.

Figure 8:
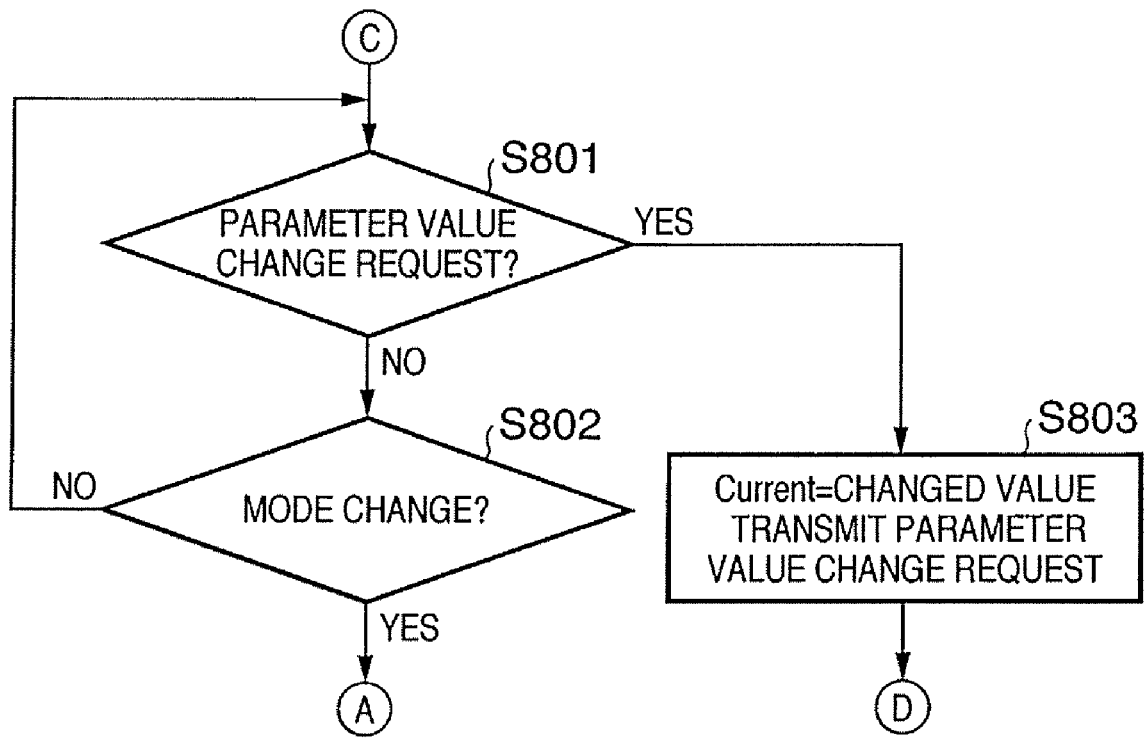
FIG. 8 is a flowchart showing the details of a part of image acquisition processing performed in step S505 shown in FIG. 5.

In step S507, it is checked whether or not the parameter setting configuration program is to be terminated, and if not, the process moves to processing in FIG. 8.

In FIG. 8, in step S801, the main module 910 determines the presence/absence of a parameter value change request. The presence/absence of a parameter value change request is detected by determining whether or not at least one parameter-changed image displayed in an area 304 in FIG. 3 has been selected (clicked) using the mouse of the operation unit 24. If it is determined that a change request has been received, the variable "Current" is set to a parameter value corresponding to the selected image. Further, a packet requesting to set the color gain value in the DVC 1 with the new parameter value is transmitted using the asynchronous transaction using the asynchronous transaction (step S803). Then, the processing from step S504 in FIG. 5 is performed.

Note that as described above, in the present embodiment, the type of parameter to be changed can be switched by switching of the tab 305 in the variation display screen 300. Accordingly, the user, who has changed the color gain, may switch the tab 305, thereby selecting another parameter. The display on the variation screen in FIG. 3 is changed in correspondence with the switching of the tab 305, i.e., the type of parameter to be changed; however, the explanation of the change of display is omitted. In step S802, the presence/absence of a mode change request is checked. If a mode change request has been received, the processing is continued from step S402 in FIG. 4 which is processing in the preview mode.

Figure 6:
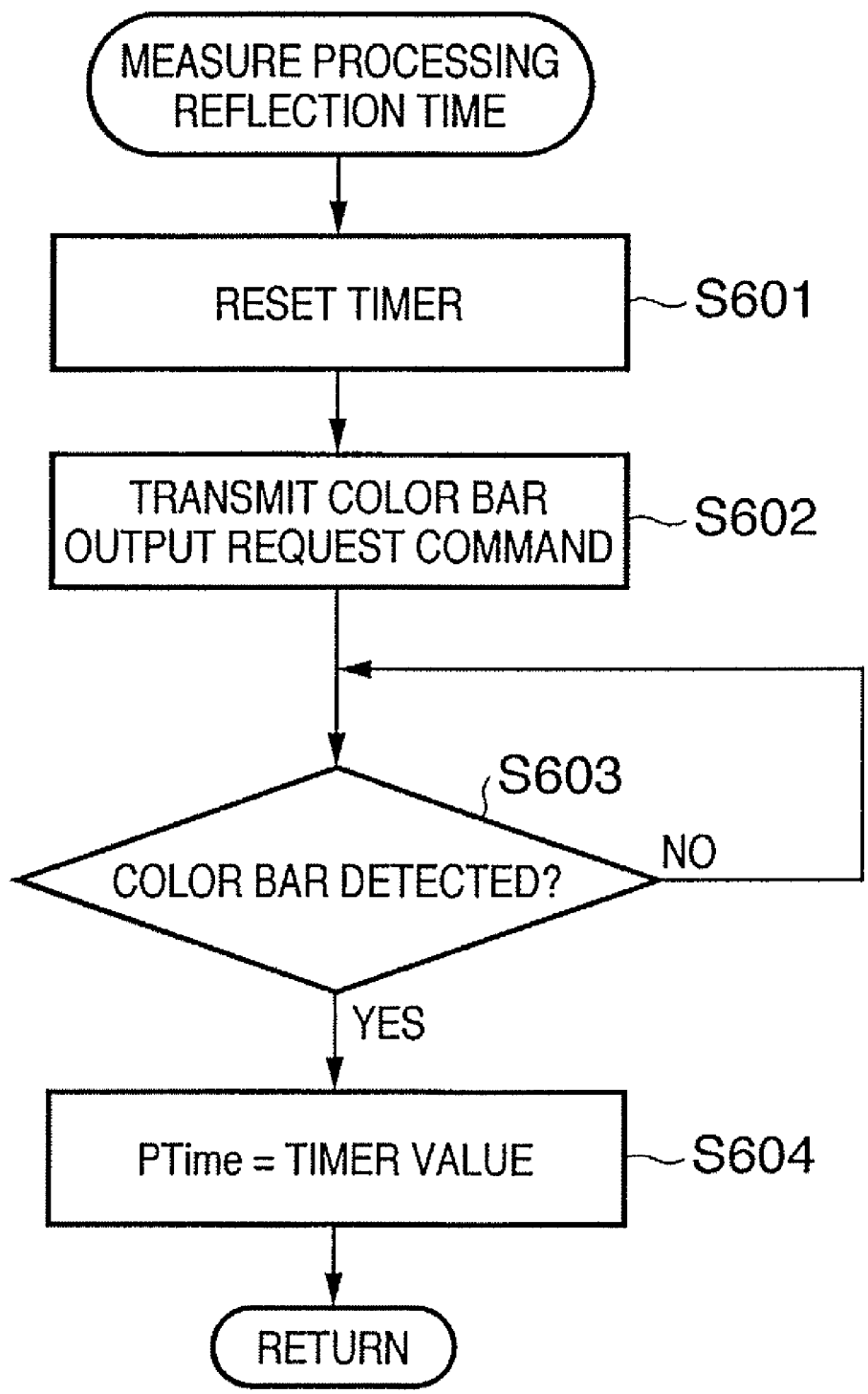
FIG. 6 is a flowchart showing the details of processing reflection time measurement processing performed in step S501 shown in FIG. 5.

Next, the processing reflection time measurement processing in step S501 will be described using the flowchart of FIG. 6.

In step S601, a timer managed by the main module 910 is reset, thereby an internal variable PTime is set to "0". In step S602, the main module 910 transmits an asynchronous packet, including a command requesting output of a color bar image as an example of an image having a known pattern, to the DVC 1, and starts the timer. Note that when the time difference from the timer reset to the command transmission is negligible, the timer may be started at the same time of the timer reset. In step S603, the main module 910 decompresses the received image using the decompression processing module 902, and detects whether or not a color bar image has been received.

That is, the DVC 1 outputs an image obtained by image capturing before the transmission of the color bar output request command at S602. On the other hand, a color bar image is still image data having predetermined colors in predetermined positions. Accordingly, the main module 910 checks in the decompressed image whether or not pixel values in particular positions are predetermined pixel values, thereby easily determining whether or not the received image is an image obtained by image capturing or a color bar image.

In step S603, if it is determined that a color bar image has not been received, step S603 is repeated until a color bar image is detected. When a color bar image has been detected, then in step S604, the variable PTime is set to the timer value upon detection of the color bar image. Thus, the variable PTime holds processing reflection time from the image processing request from the PC 2 to the acquisition of the result.

In the present embodiment, the time from the transmission of the color bar output request command to the detection of color bar image as a result is measured as the processing reflection time. However, an output request of another image may be transmitted as long as the image can be distinguished from an ordinary image obtained by image capturing. For example, in a case where an image obtained by the DVC 1 can be outputted as a color image or a monochrome image and the output of color/monochrome image is selectable in accordance with a command transmitted from the outside, the time from transmission of a switch request command to detection of the switched image is measured as the processing reflection time.

That is, when the digital video camera outputs a color image, the time from transmission of a monochrome video output request command to detection of a monochrome image is measured. Further, when the digital video camera outputs a monochrome image, the time from transmission of a color video output request command to detection of a color image is measured. The detection of monochrome/color image is easily performed by checking the color difference information of a particular pixel on the image.

Figure 7:
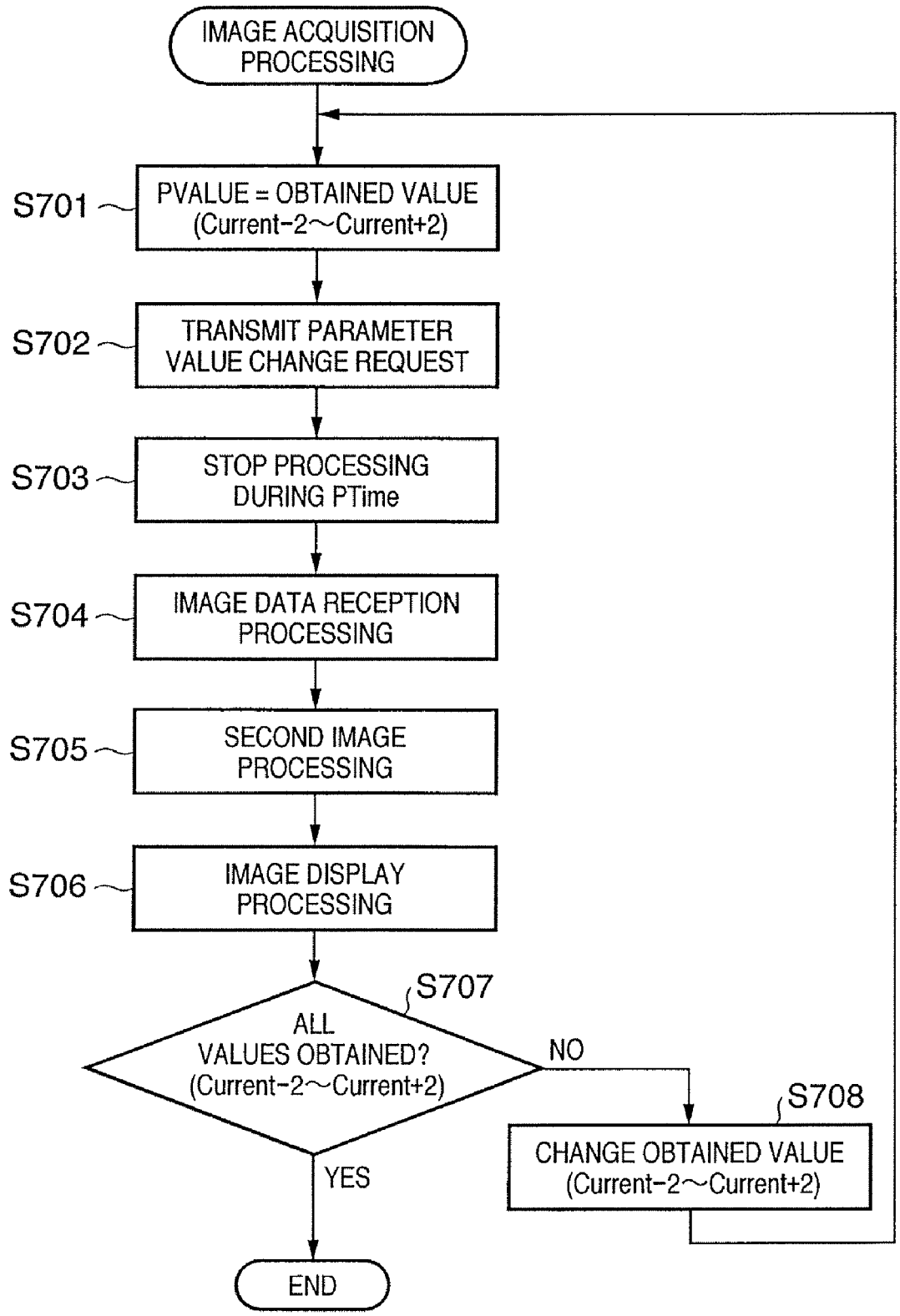
FIG. 7 is a flowchart showing the details of a part of image acquisition processing performed in step S505 shown in FIG. 5.

Next, the image acquisition processing in step S505 will be described using the flowchart of FIG. 7.

In step S701, the main module 910 configures the color gain value of an image obtained next as Pvalue. For example, when the value of the variable Current holding the current value obtained in step S503 is "5", the Pvalue is set to "4" decremented by "1" from the current value.

In step S702, the main module 910 transmits an asynchronous packet, including a command to configure the value of a parameter to be changed to the value of the PValue, to the DVC 1. In step S703, the process stops (sleeps) during the Ptime, waiting for the determination of the image changed using the Pvalue.

Note that phrase "the process stops" means that there is a transition to a state where electrical power consumption is less than that in a normal processing state (power saving mode). Accordingly, in addition to the stoppage of the processing, arbitrary operations performed in a so-called sleep mode or a power saving mode such as a slow down of the clock of the CPU, the powering off of the display, and the stoppage of the hard disk drive may be performed.

After the elapse of the PTime, the process restarts, and in step S704, the received image data is stored into the first memory area (905) as shown in FIG. 10B (corresponding to the first memory area 121). Then in step S705, processing as the second image processor 26 (second image processing) is performed. That is, the decompression module 902 decompresses only a part of the frames of the GOP data stored in the first memory area 905, i.e., only the I frame in the present embodiment, and stores the decompressed data into the second memory area 906 as shown in FIG. 12B (corresponding to the second memory area 122). The extraction of only the I frame data from the GOP data can be easily realized by discriminating the I frame using information described in the headers of the respective frames.

Further, the resize processing module 903 changes the I frame image data stored in the second memory area 906 to the display size (size corresponding to the area 304), and stores the resized data into the third memory area 907 as shown in FIG. 12B (corresponding to the third memory area 123). In this manner, in the present embodiment, in the preview mode and the variation mode, different image processings are performed on received image data.

In the variation mode, decompression, resizing and display processings are performed on a part of image frames constructing image data, particularly the I frame. Accordingly, the processing load is light. Further, after the transmission of a parameter change request command in step S702, the process stops during the PTime in step S703. Accordingly, in the variation mode, the electric power consumption can be saved.

In step S706, an image recorded on the third memory area 907 is displayed in one of the areas 304 of the variation display screen 300 by the display module 904. Further, when the parameter value is set to the Current value, it is displayed in the central area 302.

Thus, the image processed with the current parameter value arranged in the central position can be compared with the images resulting from processing with respectively-changed different parameter values at once. The user can set a parameter to obtain a desired result.

In the present embodiment, the above processing is repeatedly performed on a color gain value which can be set to "0" to "10". That is, in step S707, the main module 910 determines whether or not images corresponding to all the configurable parameter values have been obtained. If it is determined that the images have not been obtained, the main module 910 configures the Pvalue to one of the remaining values, and then the image acquisition is performed. As the configuration of the Pvalue is not the subject matter of the present invention, the Pvalue may be sequentially configured from "0" to "10", or may be configured in accordance with other algorithms.

Further, it is not necessary to perform the image acquisition processing on all the configurable values of the parameter to be changed. Especially, regarding a parameter having many configurable values or minutely-configurable parameter, it may be arranged such that the image acquisition processing is performed on only discrete values corresponding to the number of the areas 304 in the variation display screen 300.

Otherwise, it may be arranged such that regarding the same parameter, different parameter value ranges are allocated to respective screens, and the screen is switched using the tab 305. For example, when the number of areas 304 is five per one screen and a parameter having ten configurable values other than the Current value is handled, images corresponding to value 1 to value 5 are displayed in the areas 304 of screen 1, and images corresponding to value 6 to 10 are displayed in the areas 304 of screen 2. The screen 1 and screen 2 are switched in accordance with operation of the tab 305.

Further, it may be arranged such that upon a change from the screen 1 to the screen 2, the image acquisition processing to obtain the images corresponding to the value 6 to value 10 is performed.

As described above, according to the present embodiment, it is possible to configure an image processing parameter in an image input device from an external device while checking image data obtained by the image input device on a display of the external device. Especially, when the external device is an image processing apparatus, as the parameter value can be configured so as to obtain a desired result on the image processing apparatus side, the problem that the result differs in accordance with stage of image processing can be solved.

Further, the parameter value configuration can be more easily performed by displaying images obtained with a plurality of parameter values such that the images can be compared with an image obtained with a current parameter value.

Further, when a parameter value is configured, as the processing load can be reduced, the electric power consumption can be reduced, and the parameter value configuration can be performed in an image capturing site.

OTHER EXEMPLARY EMBODIMENT

Further, the above exemplary embodiment may be realized as software using a computer (or a CPU, an MPU or the like) of a system or an apparatus.

Accordingly, a computer program installed into the computer to realize the functional processings of the present invention also realizes the present invention. That is, the computer program to realize the functional processings of the present invention is included in the present invention.

In such case, the computer program may be executed in any form, such as an object code, a program executed by an interpreter, or script data supplied to an OS as long as it has the functions of the computer program.

In this case, the computer program to realize the functional processings of the present invention is supplied to the computer via a storage medium or cable/radio communication. Examples of storage media that can be used for supplying the computer program are magnetic storage media such as a flexible disk and a hard disk, optical/magneto-optical disks such as an MO, a CD and a DVD, and nonvolatile semiconductor memories.

As for the method of supplying the computer program using cable/radio communication, a server on a computer network may be utilized. In this case, a computer program file as a file including the computer program constituting the present invention is stored in a server. As the computer program file, an executable file or source code may be used.

Then, the computer program file is supplied to a client computer accessed the server by downloading. In this case, the computer program file may be divided into a plurality of segment files and stored in different servers.

That is, the server to supply the computer program file to realize the functional processings of the present invention to the client computer is also included in the present invention.

Further, it is also possible to encrypt and store the computer program of the present invention on a storage medium, distribute the storage medium to users, supply key information to users who meet certain requirements, and allow these users to decrypt the encrypted program by using the key information and install the computer program in the user computers. The key information is supplied by e.g. downloading from a website via the Internet.

Further, the computer program that causes the computer to implement the functions described in the above exemplary embodiment may use an operating system already running on the computer.

Further, it may be arranged such that at least a part of the computer program constituting the present invention is provided as firmware such as an expansion board inserted into a computer, and the functions described in the above exemplary embodiment are realized utilizing a CPU of the expansion board or the like.

While the present invention has been described with reference to the exemplary embodiments, it is to be understood that the present invention is not limited to the disclosed exemplary embodiments. The scope of the following claims is to be accorded the broadest interpretation so as to encompass all modifications, equivalent structures and functions.

This application claims the benefit of Japanese Patent application No. 2005-310501, filed on Oct. 25, 2005, which is hereby incorporated by reference herein in its entirety.

What is claimed is:

1. A parameter configuration apparatus for configuring an image processing parameter used in an image input device, the parameter configuration apparatus comprising:

a communication unit that (a) receives, from the image input device, a current parameter value of the image processing parameter, (b) transmits, to the image input device, different parameter values of the image processing parameter, wherein the different parameter values are different from the current parameter value, (c) receives, from the image input device, image data corresponding to the current parameter value, and (d) receives, from the image input device, a plurality of image data corresponding to the different parameter values, the plurality of image data having been processed by the image input device using the respective different parameter values; and a control unit that (a) displays, in a predetermined area of a screen, an image which corresponds to the image data corresponding to the current parameter value, the image data having been received from the image input device, (b) displays, in different areas of the screen, images which correspond to the plurality of image data corresponding to the different parameter values, the plurality of image data having been received from the image input device, wherein the different areas are different from the predetermined area, so that the displayed image which corresponds to the image data corresponding to the current parameter value and the displayed images which correspond to the plurality of image data corresponding to the different parameter values are visible at the same time, and (c) requests the image input device to change the current parameter value to one of the different parameter values which corresponds to a selected one of the images displayed in the different areas.

2. The parameter configuration apparatus according to claim 1, wherein the image processing parameter is used to change a color gain.

3. The parameter configuration apparatus according to claim 1, wherein the image processing parameter is used to change one of a horizontal detail frequency, a horizontal/vertical detail balance, a noise reduction, and a coring.

4. The parameter configuration apparatus according to claim 1, wherein the image processing parameter is used to change a color matrix.

5. The parameter configuration apparatus according to claim 1, wherein the image processing parameter is used to change a color hue.

6. The parameter configuration apparatus according to claim 1, wherein the image processing parameter is used to change one of a red gain, a green gain, and a blue gain.

7. The parameter configuration apparatus according to claim 1, wherein the image processing parameter is used to change a white balance.

8. The parameter configuration apparatus according to claim 1, wherein the image processing parameter is used to change a balance between two colors.

9. The parameter configuration apparatus according to claim 1, wherein the image input device includes one of a digital video camera, a digital camera, and a cellular phone.

10. A method of configuring an image processing parameter used in an image input device, the method comprising the steps of:
receiving, from the image input device, a current parameter value of the image processing parameter;
transmitting, to the image input device, different parameter values of the image processing parameter, wherein the different parameter values are different from the current parameter value;
receiving, from the image input device, image data corresponding to the current parameter value;
receiving, from the image input device, a plurality of image data corresponding to the different parameter values, the plurality of image data having been processed by the image input device using the respective different parameter values;
displaying, in a predetermined area of a screen, an image which corresponds to the image data corresponding to the current parameter value, the image data having been received from the image input device;
displaying, in different areas of the screen, images which correspond to the plurality of image data corresponding to the different parameter values, the plurality of image data having been received from the image input device, wherein the different areas are different from the predetermined area, so that the displayed image which corresponds to the image data corresponding to the current parameter value and the displayed images which correspond to the plurality of image data corresponding to the different parameter values are visible at the same time; and
requesting the image input device to change the current parameter value to one of the different parameter values which corresponds to a selected one of the images displayed in the different areas.

11. The method according to claim 10, wherein the image processing parameter is used to change a color gain.

12. The method according to claim 10, wherein the image processing parameter is used to change one of a horizontal detail frequency, a horizontal/vertical detail balance, a noise reduction, and a coring.

13. The method according to claim 10, wherein the image processing parameter is used to change a color matrix.

14. The method according to claim 10, wherein the image processing parameter is used to change a color hue.

15. The method according to claim 10, wherein the image processing parameter is used to change one of a red gain, a green gain, and a blue gain.

16. The method according to claim 10, wherein the image processing parameter is used to change a white balance.

17. The method according to claim 10, wherein the image processing parameter is used to change a balance between two colors.

18. The method according to claim 10, wherein the image input device includes one of a digital video camera, a digital camera, and a cellular phone.

19. A non-transitory storage medium that stores a computer program for executing a method of configuring a parameter value of an image processing parameter used in an image input device, the method comprising the steps of:
receiving, from the image input device, a current parameter value of the image processing parameter;
transmitting, to the image input device, different parameter values of the image processing parameter, wherein the different parameter values are different from the current parameter value;
receiving, from the image input device, image data corresponding to the current parameter value;
receiving, from the image input device, a plurality of image data corresponding to the different parameter values, the plurality of image data having been processed by the image input device using the respective different parameter values;
displaying, in a predetermined area of a screen, an image which corresponds to the image data corresponding to the current parameter value, the image data having been received from the image input device;
displaying, in different areas of the screen, images which correspond to the plurality of image data corresponding to the different parameter values, the plurality of image data having been received from the image input device, wherein the different areas are different from the predetermined area, so that the displayed image which corresponds to the image data corresponding to the current parameter value and the displayed images which correspond to the plurality of image data corresponding to the different parameter values are visible at the same time; and
requesting the image input device to change the current parameter value to one of the different parameter values which corresponds to a selected one of the images displayed in the different areas.

20. The non-transitory storage medium according to claim 19 wherein the image processing parameter is used to change a color gain.

21. The non-transitory storage medium according to claim 19, wherein the image processing parameter is used to change one of a horizontal detail frequency, a horizontal/vertical detail balance, a noise reduction, and a coring.

22. The non-transitory storage medium according to claim 19, wherein the image processing parameter is used to change a color matrix.

23. The non-transitory storage medium according to claim 19, wherein the image processing parameter is used to change a color hue.

24. The non-transitory storage medium according to claim 19, wherein the image processing parameter is used to change one of a red gain, a green gain, and a blue gain.

25. The non-transitory storage medium according to claim 19, wherein the image processing parameter is used to change a white balance.

26. The non-transitory storage medium according to claim 19, wherein the image processing parameter is used to change a balance between two colors.

27. The non-transitory storage medium according to claim 19, wherein the image input device includes one of a digital video camera, a digital camera, and a cellular phone.

* * * * *